Figure 1:
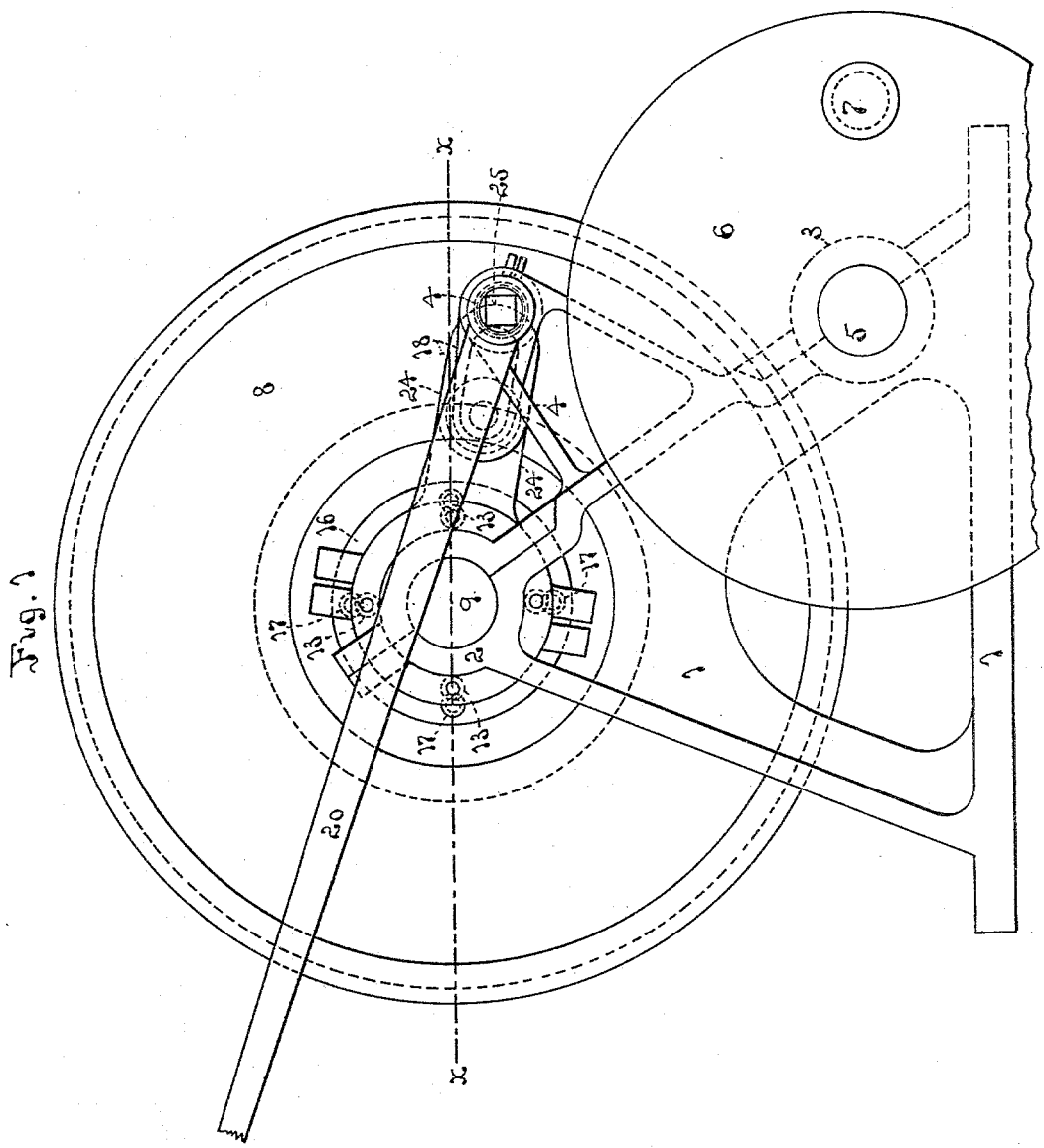

(No Model.) 3 Sheets—Sheet 1.

F. W. SCOTT.
HOISTING ENGINE.

No. 556,699. Patented Mar. 17, 1896.

Witnesses:
Wm. S. Brown
John F. Libby

Inventor
Frederic W. Scott
by his attorney
Lepine Hall Rice.

(No Model.) 3 Sheets—Sheet 2.
F. W. SCOTT.
HOISTING ENGINE.
No. 556,699. Patented Mar. 17, 1896.
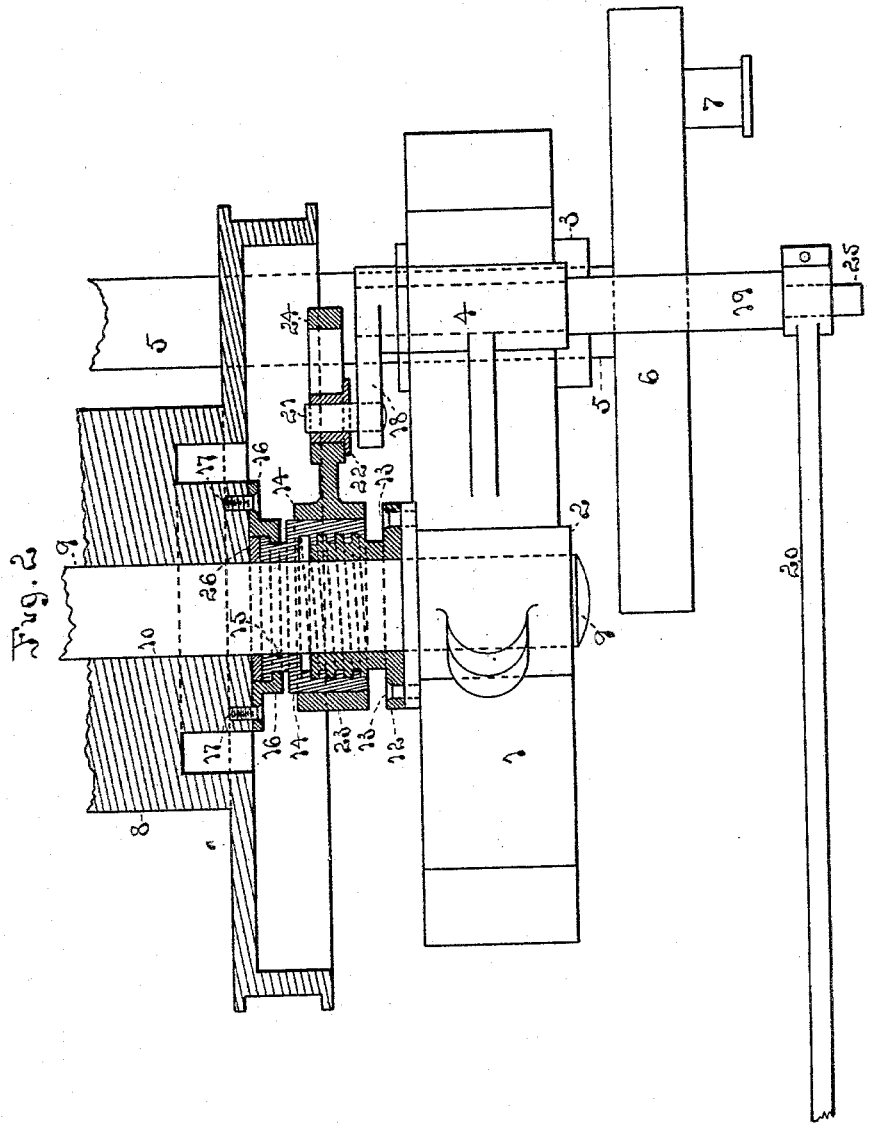
Witnesses
Wm. B. Brown
John F. Libby
Inventor
Frederic W. Scott
by his attorney
Lepine Hall Rice.

(No Model.) 3 Sheets—Sheet 3.
F. W. SCOTT.
HOISTING ENGINE.
No. 556,699. Patented Mar. 17, 1896.
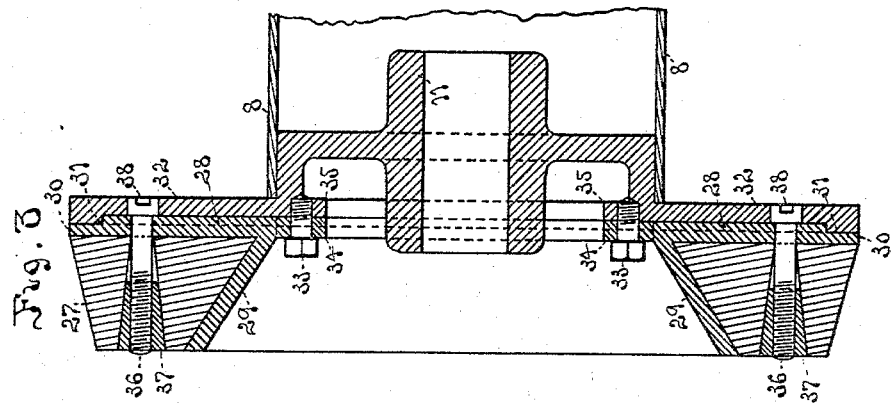
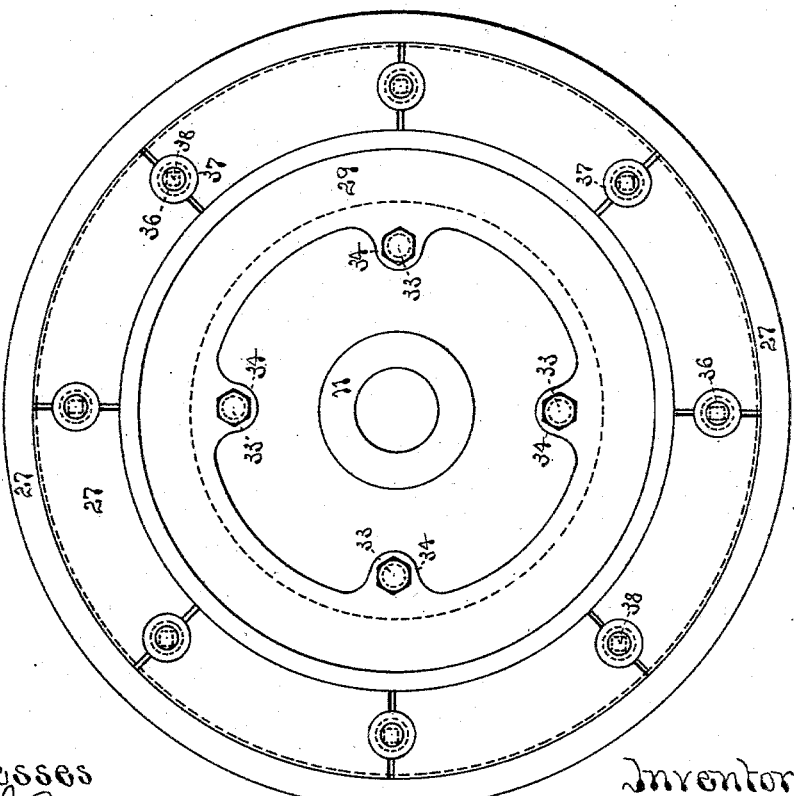
Witnesses
Inventor
Frederic W. Scott
by his attorney
Lepine Hall Rice

UNITED STATES PATENT OFFICE.

FREDERIC W. SCOTT, OF CAMBRIDGE, MASSACHUSETTS, ASSIGNOR TO JOHN G. MORRISON, OF SAME PLACE.

HOISTING-ENGINE.

SPECIFICATION forming part of Letters Patent No. 556,699, dated March 17, 1896.

Application filed July 22, 1895. Serial No. 556,738. (No model.)

*To all whom it may concern:*

Be it known that I, FREDERIC W. SCOTT, a citizen of the Dominion of Canada, residing at Cambridge, in the county of Middlesex and State of Massachusetts, have invented new and useful Improvements in Hoisting-Engines, of which the following, taken in connection with the accompanying drawings, is a specification.

My invention consists in improvements upon the invention of George W. Rawson and George E. Worthen in hoisting apparatus, patented March 16, 1886, No. 337,866.

In the drawings, Figure 1 is a side elevation of the apparatus from the lever side. Fig. 2 is a horizontal section of the same on the line $xx$ of Fig. 1, including only the lever side of the apparatus. Fig. 3 is a like section, including only the friction end of the drum. Fig. 4 is an elevation of the friction end of the drum.

The working parts of the machine are supported by a frame 1, which is shown only at the lever end, since the friction end is the same as in the patent above referred to, carrying the other bearing of the main driving-shaft with its pinion and the gear on the drum-shaft with its internal conical friction-surface, these elements being precisely the same as in the said patent.

The frame as shown in Fig. 1 carries three bearings—that of the drum-shaft 2, that of the main driving-shaft 3, and that of the lever 4. Upon the main driving-shaft 5 is mounted the ordinary balance-wheel 6 with crank-pin 7, to be connected with any desired source of motion. The drum 8 is mounted loosely upon the main driving-shaft 9, its bearings being at 10, Fig. 2, and 11, Fig. 3. There is a hub 12 surrounding the drum-shaft 9 and screwed to the frame by the screws 13, whose outer surface is provided with a high-pitched thread, upon which is fitted the nut 14. The nut has a grooved projection 15 engaged by a collar 16 attached to the drum by screws 17. By this arrangement the drum may rotate independently, but longitudinally must follow the nut, a turn of the latter in one direction moving the drum into engagement with the internal conical friction-surface of the gear at the other end and an opposite turn disengaging it.

So far the apparatus is that shown in the said patent, except in the pivoting of the lever, now to be explained. In that patent there is an arm one of whose ends is fashioned into a collar fitting upon a nut corresponding to the nut 12 and arranged to be clamped thereon, the other end of the arm being fashioned into a handle, to be grasped by the operator in engaging and disengaging the friction. This device, however, has been found open to various objections—among them that the handle would not stay where put, owing to the drag of the collar on the nut, and that if the position of the handle was right for one operator it was wrong for another and could not readily be adjusted, because the nut was inaccessible to be held during the adjustment. To remove these objections I have invented the following contrivance: A rock-shaft 19 is journaled in the bearing 4. To its outer end the long arm 20, terminating in a handle, (not shown,) is adjustably clamped. Upon its inner end is cast a short arm 18, into which is inserted a pin 21, on which is journaled a flanged steel roller 22. Upon the nut 14 is fitted an adjustable collar 23, from which projects a radially-slotted piece 24 embracing the roller 22 and so proportioned that the roller 22 when in line between shaft 9 and shaft 19 is just at the inner end of the slot, as clearly shown in Fig. 2, and so proportioned also that when the roller is at the outer end of the slot the arm 18 and piece 24 will be at about right angles.

It will be seen that the position shown in the figure is the middle position of the rock-shaft 19 and arm 20, for they may be swung over from left to right, carrying the piece 24 up, or over from right to left, carrying the piece 24 down, and at either extremity of the stroke the arm 20 will stay put, because at those points the pressure of the piece 24 is endwise upon the arm 18.

It will also be seen that the greatest leverage is obtained at the point where the friction is engaged and at the point of beginning the movement of the drum toward the clutch, just where it is most needed.

The apparatus is completely adjustable. The rock-shaft 19 has a square end 25, which may be held by a wrench while the arm 20 is loosened and reclamped in any position to suit the operator, while the collar 23 may be independently adjusted upon the nut to take up wear on the rare occasions on which this need be done.

In Fig. 2, 26 is a steel washer inserted between the drum 8 and the nut 14.

To the end of the drum 8 shown in Figs. 3 and 4 is attached a friction-surface 27 of wood or the like, shaped to fit the internal conical surface of the gear, as fully shown in the above-mentioned patent; but I have invented a new way of attaching and adjusting the same. Heretofore the wood has been affixed to the flange of the drum by bolts secured by keys.

My invention consists first in mounting the wood 27 on a separate disk 28, with a conical flange 29 thereon and with a circular recess 30, into which fits accurately an annular ridge 31 on the flange 32 of the drum 8. The disk 28 and the flange 32 are secured together by bolts 33 through corresponding ears 34 35 in them. When the surface of the wood has become much worn, the disk 28 may be readily detached and sent to the shop for a new wood cone without disturbing the drum and its connections, and when returned and replaced is automatically centered by the fit of the ridge 31 in the recess 30. The bolts 36 that secure the wood to the disk fit into conical nuts 37, which rest in conical holes in the wood, and the bolt-heads project into holes bored through the flange 32 and lie flush with the inner surface of the latter, being turned up by a square-ended wrench or bar inserted in square recesses 38. The wood may be arranged in any suitable sections, being preferably in thin layers parallel with the disk 28, quartered and staggered. If, now, the wood works loose at any point in its circumference, it may be immediately turned up snug without more ado than stopping the drum a moment.

What I claim as new and of my invention is—

1. The combination of the arm 20, the rock-shaft 19, the arm 18, the pin 21, the roller 22, and the slotted piece 24 engaged by said pin and roller and actuating the friction-clutch mechanism, substantially as described.

2. The combination of the wearing-surface 27, the bolts 36, the conical nuts 37, the disk 28, and the drum 8 and drum-flange 32, substantially as described.

3. The combination of the separate disk 28 with its conical flange, and the wooden friction-ring 27 secured to it ready for attachment to the drum-flange 32, substantially as described.

In testimony whereof I have signed my name to this specification, in the presence of two subscribing witnesses, on this 20th day of July, A. D. 1895.

FREDERIC W. SCOTT.

Witnesses:
ERNEST C. GOODALE,
LEPINE HALL RICE.